United States Patent [19]
Shapiro

[11] 4,269,252
[45] May 26, 1981

[54] TIRE PRESSURE MAINTENANCE DEVICE

[76] Inventor: David Shapiro, 555 Greenplace, Woodmere, N.Y. 11598

[21] Appl. No.: 57,893

[22] Filed: Jul. 16, 1979

[51] Int. Cl.³ .............................................. B60C 23/12
[52] U.S. Cl. ..................................... 152/426; 152/429
[58] Field of Search ............... 152/418, 419, 425, 426, 152/429, 424

[56] References Cited

U.S. PATENT DOCUMENTS

| | | | |
|---|---|---|---|
| 535,505 | 3/1895 | Moore | 152/426 |
| 1,246,464 | 11/1917 | Randall | 152/426 |
| 2,214,597 | 9/1940 | Smith | 152/426 |
| 2,420,224 | 5/1947 | Bymark | 152/426 |
| 3,097,682 | 7/1963 | Harkins | 152/429 |
| 3,150,705 | 9/1964 | Geraghty | 152/426 |
| 3,247,882 | 4/1966 | Pratt | 152/429 |

FOREIGN PATENT DOCUMENTS 803570  10/1936  France ................................... 152/426

*Primary Examiner*—Michael G. Wityshyn
*Attorney, Agent, or Firm*—Richard L. Miller

[57] ABSTRACT

An air pump mechanism which automatically pumps a small quantity of air into an automobile tire upon each rotation of the wheel in order to keep the tire from slowly deflating; the mechanism including an air pump inside the tire which is operated each time that the tire is deformed by rolling on the road surface, and the mechanism also including an adjustable safety valve to prevent over-inflation.

4 Claims, 7 Drawing Figures

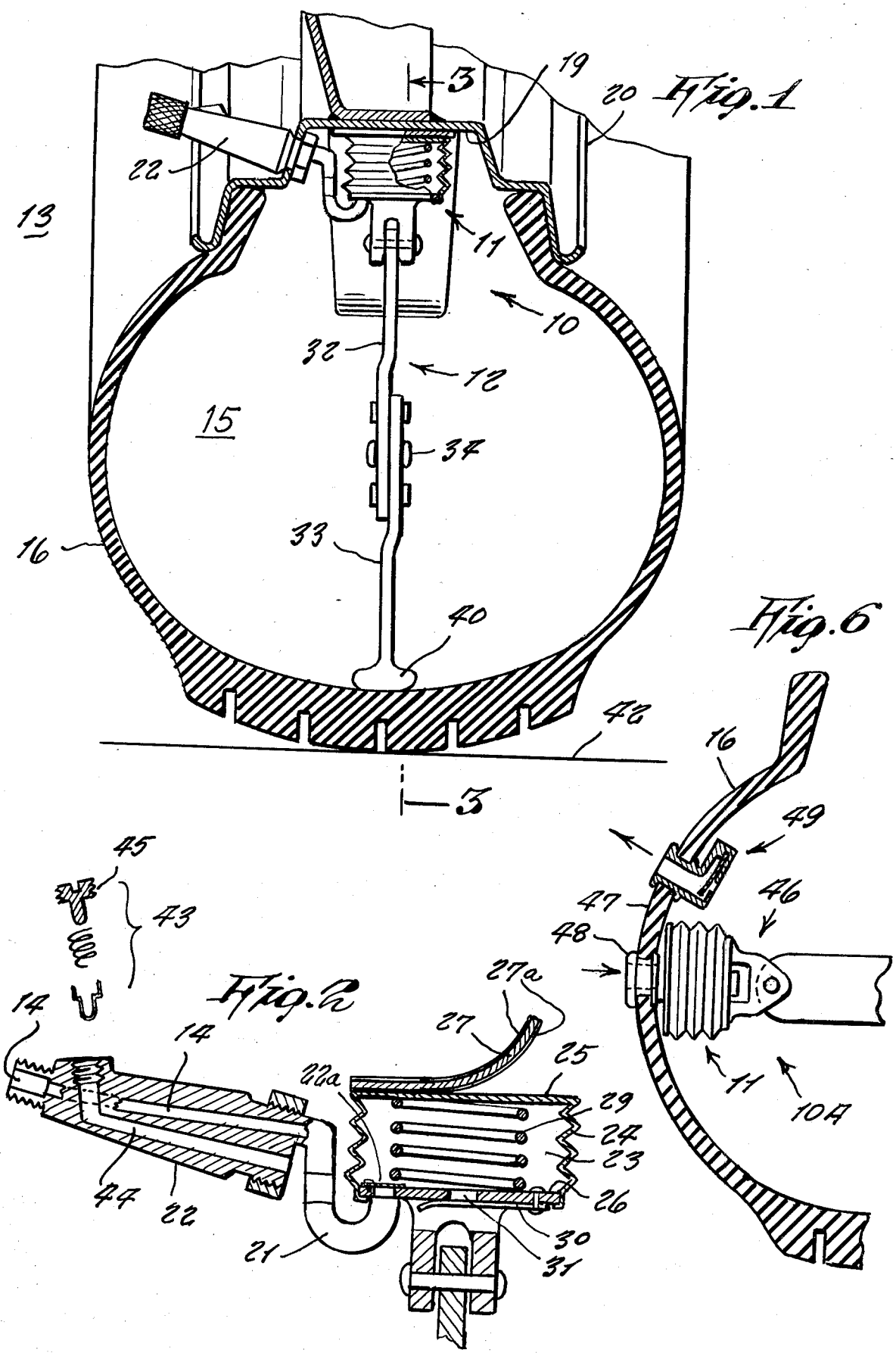

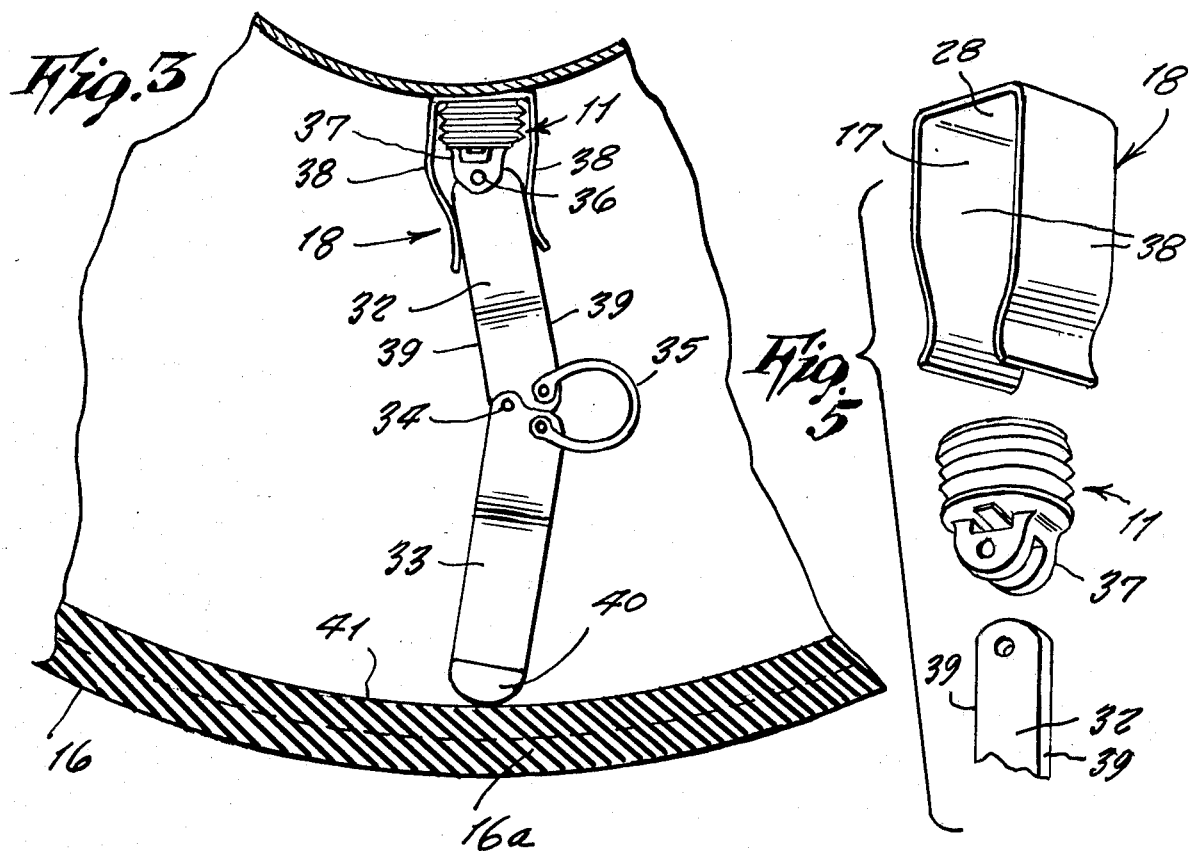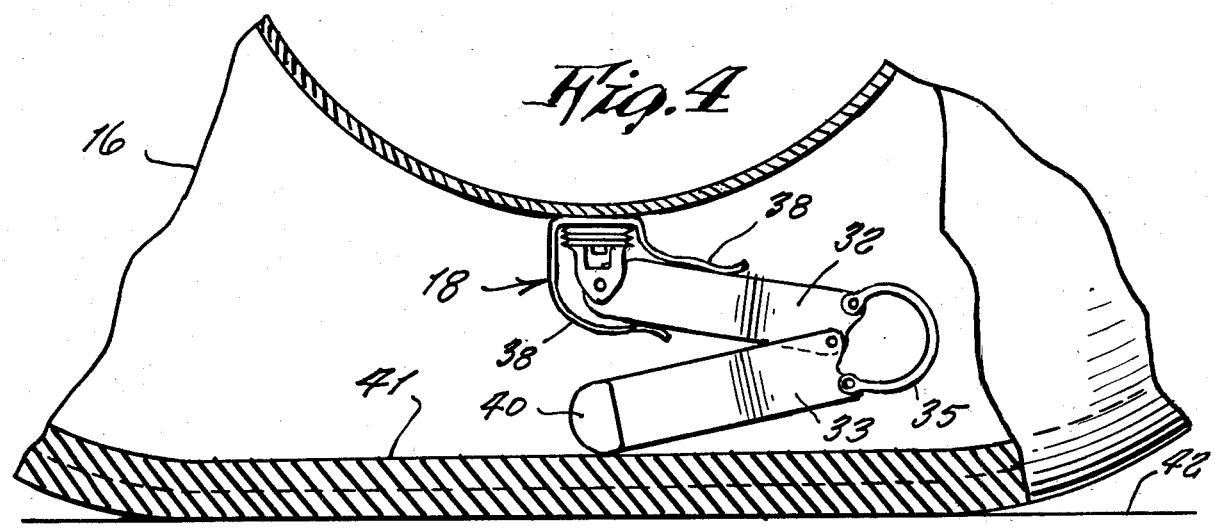

TIRE PRESSURE MAINTENANCE DEVICE

BACKGROUND OF THE INVENTION

This invention relates generally to automotive vehicles. More specifically it relates to tire air pumps.

It is well known to most motorists that they are advised by automobile manufacturers to check the air pressure of their tires periodically to prevent them from becoming partly deflated, as riding upon insufficiently inflated tires causes them to wear out more quickly or unevenly. However, many motorists tend to disregard this advice because it is too inconvenient to check air pressure frequently. Tires in general tend to hold their pressure for quite some time before enough air leaks out so as to be noticeable, and then be corrected. Unfortunately, by this time, the tire tread is already affected. Also, as a tire ages and wears thinner, it has a greater likelihood of developing small air leaks due to punctures by road surface objects, so that it loses air more rapidly, and requires more frequent air inflating. Most motorists desire an improvement that would relieve them of this need for additional attention to tire pressure maintenance.

SUMMARY OF THE INVENTION

Accordingly, it is a principal object of the present invention, to provide a device on each wheel or tire which automatically keeps a tire fully inflated at a correct pressure at all times without requiring the motorist's attention.

Another object is to provide a tire pressure maintenance device which additionally aids a tire punctured with a fast air leak to remain sufficiently inflated, or sufficiently re-inflates it to allow travel thereupon until the vehicle reaches a service station for a tire puncture repair.

Still a further object is to provide a tire pressure maintenance device which can be incorporated either into the manufacture of the wheel or the tire, so that the manufacturer thereof can benefit by producing a product superior to that of his competitors in the same field.

Further objects of the invention will appear as the description proceeds.

Automobile and other vehicular tires are cyclically deformed as they roll on the ground when the vehicle moves. When a portion of the tire contacts the ground it is radially compressed, the outside surface coming closer to the rim than when that portion is away from the ground. Also, the width of a portion of the tire is increased, when that portion touches the ground, relative to its width during other positions of the rotational cycle. This invention employs this cyclical deformation of the tire to operate a pump. The pump is either mounted inside the tire or made a part of it. An air inlet is provided from which air is pumped into the tire. An air outlet may be employed to regulate the pressure at a desired value.

To the accomplishment of the above and related objects, this invention may be embodied in the form illustrated in the accompanying drawings, attention being called to the fact, however, that the drawings are illustrative only, and that changes may be made in the specific construction illustrated and described while yet remaining within the scope of the appended claims.

BRIEF DESCRIPTION OF THE DRAWING FIGURES

FIG. 1 is a transverse cross sectional view of a wheel and tire showing the invention installed therein.

FIG. 2 is an enlarged cross sectional view of a valve and a bellows type pump.

FIG. 3 is a cross sectional view on line 3—3 of FIG. 1.

FIG. 4 is a similar view thereof with a tire having gone flat.

FIG. 5 is an exploded perspective view of the bellows and a spring clip into which it is fitted.

FIG. 6 is a fragmentary view similar to FIG. 1 showing a modified design of the invention.

DETAILED DESCRIPTION OF PREFERRED EMBODIMENT

Figure 7:
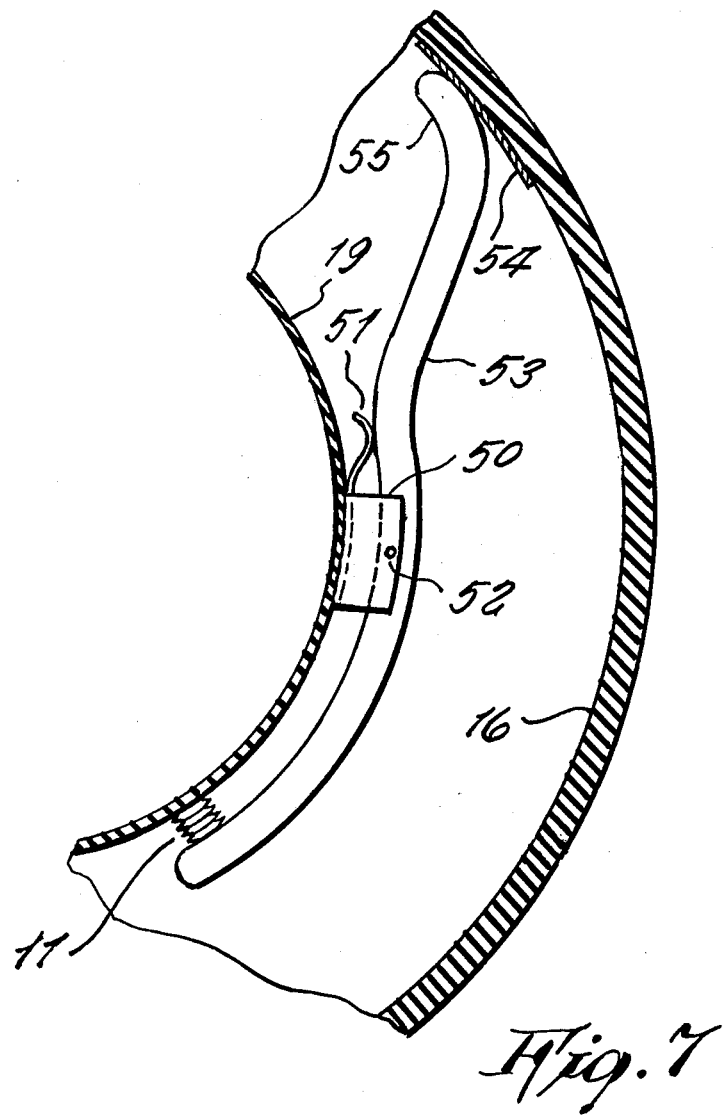
FIG. 7 shows another modified design of the invention.

Referring now to the drawings in greater detail, and more particularly to FIGS. 1 through 5 thereof, at this time, the reference numeral 10 represents a tire pressure maintenance device according to the present invention, wherein there is a pump comprising in this illustration an air bellows 11 activated by a push rod 12 so that air from the outside atmosphere 13 can be pulled by the bellows through an air inlet 14 and pushed into the interior 15 of an automotive tire 16.

The bellows is mounted inside the crotch 17 of a U-shaped spring clip 18 which is welded or otherwise rigidly secured on a peripheral face 19 of an automotive wheel 20. The bellows is connected by means of a flexible tube 21 to a stem 22 through which the air inlet extends, so to supply fresh air into the bellows interior 23, after passing through a flap valve 22a.

The bellows includes an accordion pleated, collapsible side wall 24 between rigid opposite end walls 25 and 26. The end wall 25 is adhered to one side of a flexible panel 27 having pressure sensitive adhesive 27a on both of its sides so as to adhere to the center portion 28 of the clip. The bellows contains a compression coil spring 29 that urges the bellows to expand, but when compressed permits it to contract so that the interior volume is a small fraction of that volume in the expanded condition. A flap valve 30 closes an air outlet 31 through which air travels from the bellows into the tire.

The push rod comprises two legs 32 and 33 pivotally connected together at one end about a pin 34. A spring 35, connected to each leg, urges the legs toward a straightened out position. One end of leg 32 is pivotally connected by a pin 36 to a lug 37 formed on the end wall 26 of the bellows. Opposite end leaves 38 of the clip 18 bear against opposite side edges 39 of the leg 32 so to also urge the leg into the normally radially straightened out position with the leg 33. A rounded shoe 40 formed at the opposite end of leg 33 serves to bear against the inner peripheral surface 41 of the tire 16. The tire face may be protected from excessive wear by the shoe.

Thus in operative use, each time that the wheel makes a revolution, the push rod, which normally remains straight and rigid, is pushed against the bellows, when the tire portion 16a, against which the pushrod bears, comes into contact with the road surface 42 and is deformed by the vehicle's weight, so that the distance between the tire periphery and the bellows is thus automatically shortened. This repeated action, as a wheel travels, causes air to be pumped into the tire as the vehicle travels, so that it is always fully inflated.

A safety valve 43 on the stem 22 may be employed to prevent overinflation of the tire by allowing air to leak outward therefrom through an air outlet 44. The tire pressure can be regulated, as desired, by rotation of a screw 45 of the valve 43.

In case of a tire leaking too rapidly and becoming flat, the push rod can collapse as shown in FIG. 4, due to the two interpivoted leg construction and thereby prevent damage to the tire or the bellows mechanism.

A modified design 46 of the invention is shown in FIG. 6 wherein the tire pressure maintenance device 10A is positioned between opposite side walls 47 of the tire, instead of between the wheel peripheral face 19 and the peripheral surface 41 of the tire, so as to likewise utilize the reciprocally contracting and expanding distance between the sidewalls so as to operate the push rod against the bellows. In this design, the device 10A is installed on or manufactured as part of the tire instead of being installed on the wheel as the device 10. The device 10A structurally differs from device 10 by having air enter the bellows directly through a grommet 48 made integral with bellows and wall 25 and which is riveted through the tire side wall. Thus the sidewardly projecting stem 22 would be constructed as in a conventional tire. The safety valve in the stem may accordingly be replaced by a separate safety valve unit 49 also riveted on the tire side wall, and which can be made to include the above-described tire pressure adjustability. The remainder of the bellows and push rod is the same as in the above-described device 10 so as to operate in the same manner. It is to be noted that in this design, the push rod may possibly be made as a single bar instead of two legs, as preferred by a manufacturer.

FIG. 7 is another arrangement of the invention. Here a U-shaped bracket 50 and spring 51 are secured by a bolt or by welding to the inner face 19 of the wheel. A cross pin 52 through bracket 50 serves as a pivot for lever arm 53. The arm 53 is urged by spring 51 to rotate in the clockwise direction in this illustration. One end of the arm extends to the outer wall of the tire 16 and is urged inward when that portion of the tire is depressed by the road. Pad 54 may be inserted to prevent wear on the inner surface of the tire. The other end of the arm 53 is secured by adhesive or other means to the outer end of the bellows 11. Thus the bellows 11 is expanded when the end 55 of lever arm 53 is urged inward by depression of the tire, and in contracted by action of spring 51 during other times. The bellows is thus able to provide the pumping action previously described.

The arm 53 can be made sufficiently flexible so that in the event of a flat tire the arm can be forced inward without breaking or further damaging the tire.

The pump can also be made an integral part of the tire itself. A cavity in the wall of the tire can be formed by delaminating part of the wall in such a way that the pocket is alternately expanded and compressed as the tire rolls. A small hole in each of the two wall of the pocket, covered by a flap on the surface nearer the inside of the tire, will form a pump of the desired kind.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tire pressure maintaining device, comprising in combination an air bellows for positioning within the tire, an air inlet coupled to said air bellows for entry of atmosphere air into said air bellows, an air outlet on said air bellows for exit of air from said bellows into the tire, lever arm means having one end thereof coupled to said air bellows for operation thereof and the other end thereof freely extending to the inner wall of the tire, and biasing means coupled along the mid-section of the lever arm means for bearing said other end of the lever arm means against the inner wall of the tire, said lever arm means comprising a first section comprising said one end thereof and a second end, a second section comprising said other end thereof and a fourth end, and pivot means interconnecting said second and fourth ends of said first and second sections, respectively, said biasing means comprising a spring coupling across said interconnecting ends for urging the sections into substantially colinear position, said spring expanding when the tire goes flat to permit bending of the two sections toward each other, whereby the cyclical deformation of the tire as it rolls causes a reciprocating movement of the air bellows, and wherein said biasing means also facilitates collapsing of said lever arm means in the event of a flat tire to thereby protect the tire and the air bellows.

2. The combination as set forth in claim 1, wherein said other end of said second section comprises a distal end in contact with the inner peripheral surface of the tire, said distal end comprising a foot for riding along the inner peripheral surface of the tire to protect the tire from excessive wear.

3. The combination as set forth in claim 1, wherein said device further comprises a further air outlet from said tire for air to be released into said atmosphere, and a safety valve having adjustment means for selecting the air pressure inside said tire, said further air outlet being in operative communication with said safety valve.

4. The combination as set forth in claim 3, further comprising a stem projecting outwardly from a peripheral face of a wheel rim for said tire, said stem comprising both said air inlet and said further air outlet.

* * * * *